Jan. 1, 1946.  C. M. EASON  2,391,955
CLUTCH
Filed May 6, 1942  5 Sheets-Sheet 3

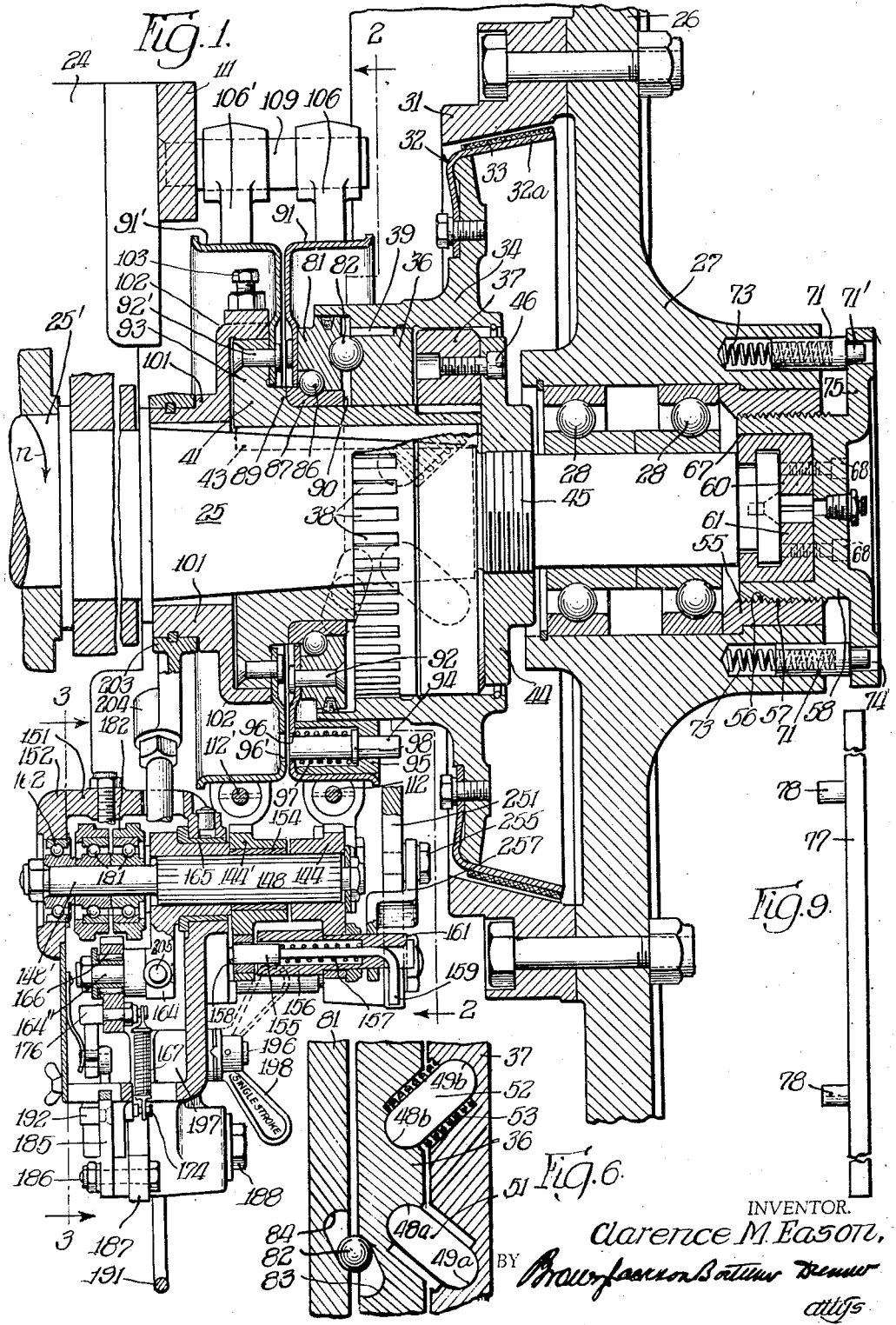

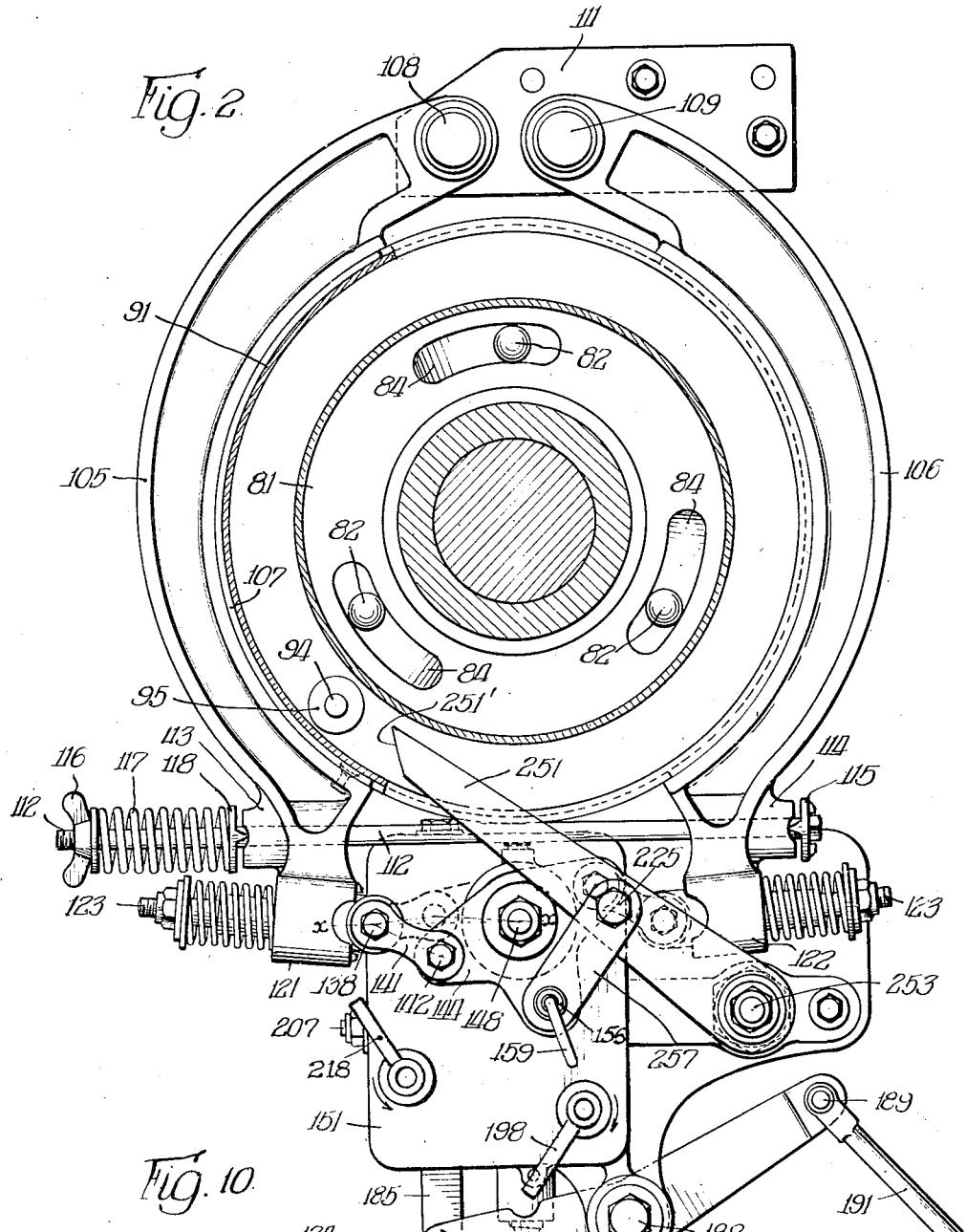
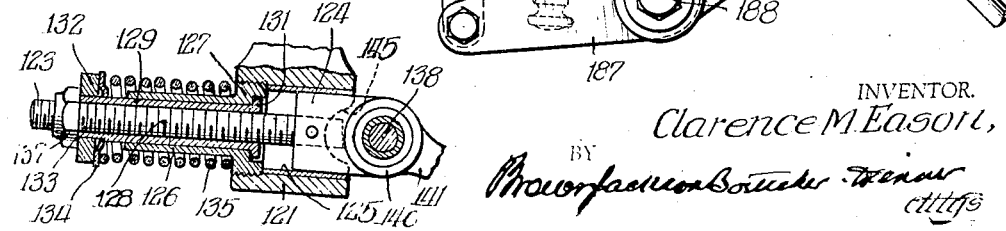

INVENTOR.
Clarence M. Eason
BY
ATTYS

Jan. 1, 1946.    C. M. EASON    2,391,955
CLUTCH
Filed May 6, 1942    5 Sheets-Sheet 4

INVENTOR.
Clarence M. Eason,
BY
Brown Jackson Boettcher Dienner
attys.

Jan. 1, 1946.  C. M. EASON  2,391,955
CLUTCH
Filed May 6, 1942   5 Sheets-Sheet 5

INVENTOR.
Clarence M. Eason,
BY
Brown Jackson Boettcher Dienner
attys

Patented Jan. 1, 1946

2,391,955

UNITED STATES PATENT OFFICE 2,391,955
CLUTCH
Clarence M. Eason, Waukesha, Wis.
Application May 6, 1942, Serial No. 441,904
19 Claims. (Cl. 192—12)

The present invention relates to clutches designed primarily for driving punch presses and such other machines and devices as are characterized by a single stroke operation, a single revolution, or other single or limited operation. While the invention resides primarily in those features of the clutch control mechanism having to do with single stroke or single trip operation of a punch press, nevertheless the invention is not essentially limited thereto because the control mechanism also includes improved features having to do with continuous or repeated running of the press.

The present invention embodies improvements on the clutch control mechanism disclosed in my prior patents: 2,340,416, issued February 1, 1944, 2,348,891, issued May 16, 1944. In these prior patents the engagement of the clutch is effected by manually actuated means, such as by the depressing of a foot treadle or like control element. This operates through the clutch control mechanism to cause engagement of the clutch for starting the cycle of the punch press. The disengagement of the clutch is thereafter effected by power actuated means which is power driven to move in synchronized relation to the motion of the ram or crank shaft of the punch press. When this power actuator starts to disengage the clutch it assumes complete control of the clutch and compels disengagement thereof irrespective of any position or motion that the manually actuated means may take. Thus, when the clutch control mechanism is set to cause single stroke operation of the punch press each time that the foot treadle is depressed, any failure to release the foot treadle with sufficient quickness does not permit the punch press to make a second stroke or repeated strokes until the treadle is released. To the contrary, the power actuator assumes dominant control and compels the clutch to release for stopping the press at the end of the single stroke operation. This feature is of decided importance because of the continuous trend toward higher and higher press speeds. This trend toward higher press speeds (approaching 1000 R. P. M.) has been particularly accentuated of late by war production requirements, and these higher speeds have greatly complicated the control of punch press clutches. For example, when operating an older type of punch press under the relatively slower speeds of approximately 100 to 150 R. P. M. heretofore prevailing in heavy duty work, it was not difficult for the operator to depress the tripping treadle for causing a single stroke operation, and to then quickly remove his foot from the treadle before another single stroke operation could start. However, when operating a press at considerably higher speeds, approaching 1000 R. P. M., it is physically impossible for the operator to depress the tripping pedal through its full range of movement for causing a single stroke operation, and still get his foot off the treadle quickly enough to prevent another cycle of operation. Accordingly, greater hazards are introduced into the operation of the clutch control mechanism by these higher speeds.

The construction disclosed in the present application is an improvement upon the constructions disclosed in my aforementioned prior patents in numerous respects, particularly in that the clutch control member, the manual actuator, and the power actuator are all uniquely arranged for rotary oscillatory motion instead of operating with an endwise reciprocatory motion. The clutch control mechanism of the present application is much more definite, positive and reliable in its operation than the clutch control mechanisms of my prior patents. Moreover, it can be constructed and assembled more cheaply and in a shorter length of time.

Another feature of the present invention resides in the inclusion of this improved construction of control apparatus in friction clutches which utilize torque responsive servo mechanisms for securing high engaging pressures of the clutch.

Another feature of the invention resides in the inclusion of this improved control apparatus in clutches utilizing power responsive thrusting mechanism for releasing the clutch.

Another feature of the invention resides in the inclusion of this improved control apparatus in clutches utilizing friction brake mechanism for governing the shifting of the shiftable clutch element.

Another feature of the invention resides in a unique operating arrangement of dual brakes, one brake for releasing the clutch and the other for stoppping the crank shaft. The operating control for the clutch releasing brake can be made to function as a common brake operator for both brakes through a novel selector arrangement which enables the crank shaft stopping brake to be connected to or disconnected from said common operator at will.

Other features, objects and advantages of the invention will appear from the following detail description of one prefered embodiment thereof. In the accompanying drawings illustrating such embodiment:

Figure 1 is a longitudinal sectional view through the axis of the clutch and its control mechanism, certain of the operating parts being fragmentarily illustrated in elevation for clarity of disclosure;

Figure 2 is the transverse sectional view corresponding approximately to a section taken on the plane of the line 2—2 of Figure 1;

Figure 6 is a developed sectional view for the purpose of showing the servo mechanism and the ball-cam mechanism; and Figures 7, 8, 9, 10 and 11 are detail views of different parts of the mechanism.

Figure 3:
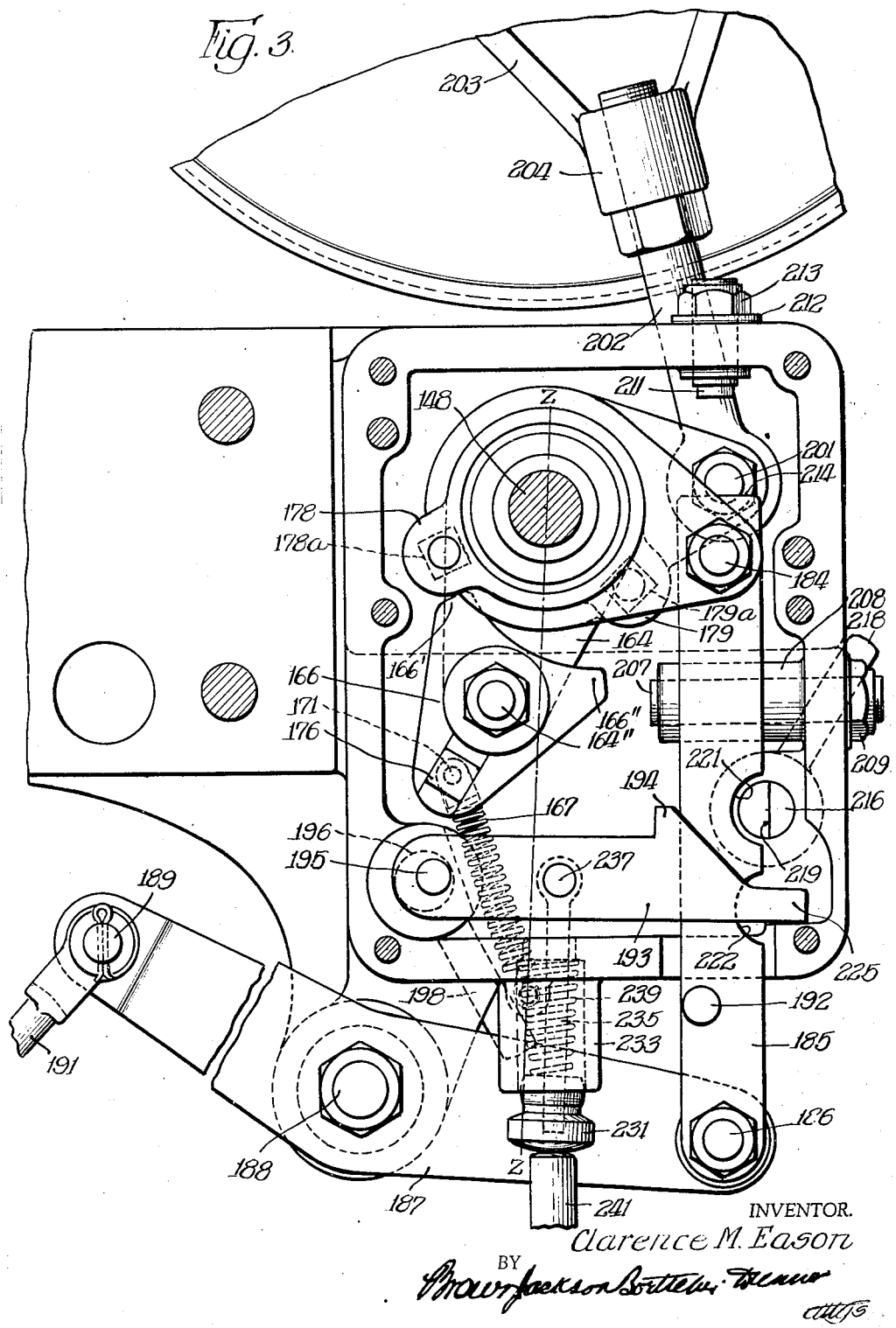
Figure 3 is a transverse sectional view of the clutch control mechanism on a larger scale, corresponding to a section taken approximately on the plane of the line 3—3 of Figure 1.

Referring first to Figure 1, the adjacent side portion and end bearing of the punch press is indicated fragmentarily at 24, the crank shaft is indicated at 25, the crank at 25', and the flywheel, belt wheel, bull gear or other driving element is indicated at 26. In the case of a back geared press, the shaft 25 may be a countershaft in the train of back gearing, instead of being a crank shaft. The hub portion 27 of said belt wheel or flywheel is journaled on the reduced outer end of the crank shaft through the medium of thrust resisting anti-friction bearings 28. The driving element of the clutch comprises a female cone member 31 which is secured to the belt wheel 26. The driven element of the clutch comprises a coacting male cone 32a, this being shiftable axially for effecting clutch engagement with the non-shiftable female cone 31. The shiftable male cone is one part of an assembly which makes up the shiftable clutch element, and which I have designated 32 in its entirety. Any suitable clutch lining material 33 is riveted, brazed or otherwise secured to the male cone 32a.

The shiftable clutch element 32 comprises a hollow hub structure 34 which is rigidly secured to a servo strut ring 36. Also housed within the relatively large hub 34 is a companion servo strut ring 37 which cooperates with the first named strut ring 36, the hub 34 being free to rotate relatively to the latter ring 37. In the preferred construction, the servo ring 36 has its outer periphery formed with a plurality of longitudinally extending external splines 38 of gear tooth form, and the hub 34 has a corresponding series of internal splines 39 projecting inwardly therefrom for interfitting engagement with the external splines 38; although a keyed or any other locking relation may be established between the hub 34 and ring 36 if desired. The two servo rings 36 and 37 are mounted in side by side relation on the outer surface of a flanged hub 41 which is rigidly anchored to the shaft 25 by a drive key 43 and by a tight fit on a tapered portion of such shaft. The ring 36, which functions as a driving ring for the servo mechanism, is free to rotate on the hub 41 and also to shift axially along said sleeve in response to the shifting force exerted by the toggle strut servo mechanism, as I shall presently describe. The other ring 37, which functions as the driven ring of the toggle strut servo mechanism, is secured fast to the flanged hub 41 so that it is held against any rotary or shifting motion relatively to said sleeve. The preferred method of securing the driven ring 37 to the hub 41 is to provide this portion of the hub with external splines of gear tooth form similar to the splines 38, and to provide the ring 37 with internal splines of gear tooth form, similar to the splines 39, for interfitting engagement with the external splines on the hub. An internally threaded thrust collar 44 screws over a thread 45 on the shaft 25 and holds the hub 41 on the tapered portion of the shaft, and also retains the toggle strut driven ring 37 against axial movement. The thrust collar 44 may be locked in any adjusted position by one or more cap screws 46 passing through holes in the collar and threading into tapped holes in the driven ring 37.

In the preferred construction illustrated, the toggle strut type of servo mechanism is employed, such as is illustrated in my prior Patents Nos. 2,308,679, 2,308,680, 2,340,416, and 2,348,891. However, if desired, the helical spline type of servo mechanism illustrated in my prior Patent No. 2,268,578, issued January 6, 1942, may also be employed in this improved clutch structure. Still further, the torque responsive servo mechanism need not be employed in the clutch structure, but the clutch may be of any spring loaded type such as is illustrated in Figure 19 of my prior Patent No. 2,340,416. Referring again to the improved construction utilizing the toggle strut servo mechanism, as shown in Figure 1, the opposing faces of the servo rings 36 and 37 are formed with pairs of cooperating substantially spherical sockets 48a and 49a for receiving toggle struts 51, and these opposing faces of the servo rings are also formed with cooperating pairs of substantially spherical sockets 48b and 49b for receiving reverse driving spring struts 52. The forward driving struts 51 and the reverse driving struts 52 are solid fixed-length steel units having relatively large spherical end heads which are accurately machined and ground for transmitting high compressive thrust loads through such end heads. The spherical sockets 48a, 48b and 49a, 49b are also accurately machined and ground, and are preferably of a slightly larger radius than the spherical ends of the struts. The fact that the two servo rings 36 and 37 are entirely separable from other parts of the clutch structure facilitates the operation of forming these spherical sockets. A relatively light compression spring 53 encircles each spring strut 52 and has its ends bearing against thrust shoulders substantially at the outer ends of the spherical sockets 48b and 49b.

There are preferably three pairs of such driving and spring struts 51 and 52 arranged in equidistant angular spacing between the servo rings 36 and 37. Of course, any desired number of pairs may be employed but three pairs afford a three-point application of the spring pressure and also of the servo pressure. The struts are preferably set at the inclined or helical angles respectively illustrated in Figure 6, the helical angle of each strut representing an angular relation of the strut with respect to the axial line of the clutch. The forward driving struts 51 are all inclined at the same common angle with respect to the axial line, and the reverse driving spring struts are all reversely or oppositely inclined at the same common angle with respect to this axial line. In the embodiment illustrated, this angular inclination is of substantially the same degree for both sets of struts, although the two sets may be disposed at considerably different angles, if desired. The degree of engaging pressure ultimately established in the clutch by the servo action of the struts can be proportioned as desired by varying the angular inclination of the struts. For example, as the angle of inclination of the struts 51 is made to approach the plane of rotation the servo action diminishes, and as the angle of inclination is made to approach the axial plane, the servo action increases.

With reference to the spring struts 52, the springs of these struts function as the loading springs which normally tend to force the shiftable clutch element 32 into engagement with the nonshiftable clutch element 31. It will be observed that by virtue of their inclined positions, these struts impart an axial component and a rotating component to the shiftable clutch element. The axial component is further supplemented by the toggle action of the driving struts 51 when transmitting a driving load. The normal direction of rotation of the clutch and crank shaft is indicated by the arrow r. It will be noted that the spring struts tend to produce relative rotation between the driven clutch element 32 and the sleeve 41 in opposite directions, i. e. they tend to rotate the driven clutch element in the forward direction of rotation r and, at the same time, they tend to rotate the sleeve 41 and the connected crank shaft 25 in the reverse direction of rotation. It is the compression springs on these spring struts 52 that are placed in the loaded or cocked condition by the inertia of the crank shaft and its connected parts when the clutch is disengaged, and which normally stand ready to effect engagement of the clutch instantly upon the tripping operation. As fully discussed in my aforementioned prior patents, these spring struts can also function as reverse drive struts. It is frequently desirable to be able to back up the press ram during the operation of changing or setting the dies, or freeing the movable dies from a jammed condition in the work, and such can be readily accomplished in my improved construction by the reverse driving capability of these reversely acting struts 52. Further details with reference to the construction and operation of the struts 51 and 52 can be had from my aforementioned prior patents.

Figure 7:
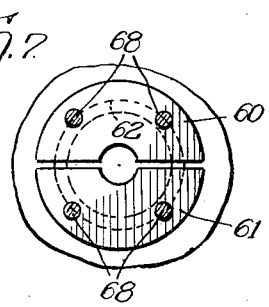
Figure 8:
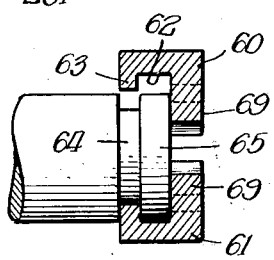

My invention also embodies improved and simplified means for adjusting the clutch to take care of wear, overload conditions, etc. This improved adjustment is effected by sliding the flywheel 26 and driving cone 31 inwardly or outwardly with respect to the shaft 25, driven clutch element 32 and thrust reaction sleeve member 37, 41. This shifting adjustment of the flywheel is effected by providing the outer end of the flywheel hub 27 with a relatively heavy internal thread 56 which is adapted to screw over a thread 57 formed on an inner adjusting sleeve 58. The internal thread 56 may be formed directly in the body of the hub 27, although for facility of machining and handling I preferably form the thread on a separate sleeve 55 which is pressed and pinned into the flywheel hub 27. A thrust sustaining coupling 60—61 serves to mount the externally threaded sleeve 58 on the end of the shaft 55 in such relation that the sleeve 58 can rotate relatively to the shaft but cannot shift endwise in either direction relatively thereto. As shown in Figures 7 and 8, this thrust sustaining coupling comprises the two duplicate coupling halves 60 and 61 each formed with one-half of an annular groove 62, and one-half of an inwardly extending flange 63. The two coupling halves are assembled radially over the end of the crank shaft 25, the two halves of the inner flange 63 fitting into an annular groove 64 formed in the shaft, and the two halves of the internal groove 62 fitting over an end flange 65 formed at the extremity of the shaft. After the two halves of the coupling have thus been assembled over opposite sides of the shaft, the internal bore 67 of the manually actuated adjusting ring 58 is passed over the coupling halves, as shown in Figure 1. Cap screws 68 are then passed inwardly through openings in the web of the adjusting ring 58, and are threaded into tapped holes formed in the outer flange portions 69 of the coupling halves, these screws fixedly securing the adjusting ring 58 against outward separation from the coupling halves 60, 61. It will be evident that rotation of the ring 58 within the internally threaded companion ring 55 is operative to cause the latter ring to screw back and forth along the thread 57 for causing the flywheel and driving clutch element to slide inwardly or outwardly along the shaft 25. A simple form of automatically releasable detent mechanism is provided for locking the adjusting ring 58 in any position of adjustment. This detent mechanism comprises a pair of diametrically opposite locking plungers 71 having slidable mounting in diametrically opposite bores in the end of the flywheel hub, springs 73 in these bores normally urging the plungers outwardly into locking position. Reduced ends 71' on the plungers are adapted to snap into diametrically opposite pairs of holes 74 formed in a flange 75 extending radially from the adjusting ring 58. The adjustment of the clutch is performed by a spanner wrench of the general construction illustrated in Figure 9. This comprises a cross bar 77 from the central portion of which projects two pins 78 which are receivable in the diametrically opposite openings 74 for releasing the detent plungers 71. The mere act of introducing the pins into the openings 74 automatically releases the detent plungers so that the adjusting ring 58 can be rotated in either direction through a distance equal to the spacing between diametrically opposite pairs of openings 74. As soon as the next pair of openings 74 comes into line with the detent plungers 71 the locked relation is automatically restored, this serving to apprise the attendant of the fact that the clutch has been adjusted through a unit degree of adjustment. The total range of adjustment may be extended through several of these units of adjustment.

Interposed between the clutch structure and the frame of the press is the rotary thrusting mechanism which utilizes the rotational motion of the driven clutch element 32 for compelling this clutch element to disengage itself from the driving clutch element 31. This thrusting mechanism comprises the ring 36, a companion ring 81 disposed on the inner side thereof, and a series of balls 82 disposed between the rings 36 and 81. As shown in section in Figure 6, the opposing faces of the two rings or plates 36 and 81 are formed with coacting cam track runways 83 and 84 for each of the balls 82. The two cam rings 36 and 81 are capable of relative rotation, as by interrupting the rotation of the ring 81, and such relative rotation operates through the balls and sloping runways 83 and 84 to create a spreading or separating pressure between the two rings for shifting the shiftable clutch element 32 to its disengaged position and for holding it in this disengaged position. As previously described, the ring 36 is fixedly secured to the shiftable clutch element 32 so that these two parts rotate and shift together, whereby outward shifting force exerted against said ring 36 is transmitted directly to the clutch element 32 for shifting the latter to disengaged position. The other cam ring 81 is also capable of rotary movement but this ring is fixed against axial shifting movement in an inward direction. To this end, a series of anti-friction thrust balls 86 roll between an externally grooved inner race 87 and an internal raceway in the ring 81, the inner race 87 abutting a shoulder 89 on the flanged hub 41 and holding the cam ring 81 against inward shifting movement. There are preferably three sets of thrust balls 82 and cam pockets 83 and 84 disposed at spaced points around the rings 36 and 81, as clearly shown in Figure 2.

The outer end of the race ring 87 projects beyond the cam ring 81 to form a stop shoulder 90 which limits the shifting movement of the servo ring 36 to the left and hence prevents the possibility of the toggle strut servo mechanism 51, 52 overloading the clutch shifting balls 82 and the thrust sustaining balls 86. Thus, any short-circuiting of the toggle strut servo ring 36 is always borne on the stop surface 90. In such short-circuiting or overload release, the thrust forces of the toggle struts are confined or self-contained within the clutch structure, being transmitted from the toggle struts through the inner servo ring 36, stop shoulder 90, ring 87, shoulder 89, flanged hub 41, shaft 25, threaded ring 44 and outer servo ring 37 back to the toggle struts. A certain amount of resiliency is inherent in the yieldable driven cone 32a, and this provides for a spring loading of both friction cones. Adjustment of the slip point or the point of overload release can be quickly and easily effected by axially shifting the flywheel 26 and driving cone 31 relatively to the driven cone 32, through rotation of the manually actuated adjusting ring 58 by spanner wrench 77, as previously described. In making such adjustment, a small amount of yield gives relatively low torque capacity and a large amount of yield gives relatively high torque capacity.

The shiftable driven clutch element 32 is adapted to be shifted to clutch releasing position by exerting braking retardation against the rotary motion of the cam ring 81, whereby the continued forward rotation of the other cam ring 36, clutch element 32 and crank shaft 25 causes the balls 82 to roll up into the shallow ends of the pockets 83 and 84 for exerting lateral separating force between the rings 36 and 81, such separating force shifting the clutch element 32 to the disengaged position. The braking retardation is exerted on the ring 81 through an annular brake drum 91. Disposed alongside the drum 91 in back to back relation is a companion brake drum 91' which is substantially a duplicate of the drum 91. This companion drum 91' is adapted to apply braking retardation to the crank shaft 25 for bringing the latter to rest immediately upon releasing the friction clutch 31, 32, and for holding the crank shaft with the crank 25' in proper elevated position until the clutch is again engaged. The brake shoes and other associated parts used in conjunction with the brake drum 91 are duplicated for the companion brake drum 91', and in both cases the same reference numerals will be employed to designate duplicate parts, with the prime suffix appended to the numerals designating the parts associated with brake drum 91'. The two drums are preferably constructed of sheet metal, and the drum 91 is secured by rivets 92 to the ring 81, whereas the other drum 91' is secured by rivets 92' to a radial end flange 93 extending outwardly from the inner end of the sleeve 41. By making the two brake drums of dished sheet metal construction and disposing them back to back, different portions of the mechanism can be extended into the hollow interiors of the two drums, thereby making the assembly of shorter axial length. Mounted within the open front of the outer brake drum 91 is a combined brake lockout and safety lug plunger 94. This plunger is guided for inward and outward reciprocation in a guide bushing or bracket 95 suitably secured within the periphery of the brake drum. The inner end of the plunger is guided in a hole 96 in the web of the brake drum 91, and this end of the plunger is adapted to be projected into a corresponding locking hole 96 formed in the web of the other brake drum 91'. When the brake is engaged and the clutch is released the holes 96, 96' are in alignment and the inward projection of the plunger 94 into the hole of the inner drum serves to lock the two brake drums together. When the drums are thus locked together, the brake can be released without engaging the clutch. Normally the brake mechanism is operative only to release the clutch and to stop rotation of the crank shaft (i. e. with the crank in the upper dead center position), but when the two brake drums are thus locked together the brake is usable at any point in the 360° rotation of the crank shaft. This is often advantageous during the operation of changing dies, adjusting dies, etc., when it may be desirable to slowly move the crank shaft forwardly or backwardly with the clutch 31, 32 released and with the brake mechanism actuatable into engaging and releasing positions to hold the crank shaft and ram in different angular positions during the setting of the dies. Surrounding the plunger 94 within a counterbore in the guide bracket 95 is a compression spring 97 which bears against the collar 98 on the plunger for normally holding the plunger in the outwardly projected unlocking position shown in Figure 1. The projecting outer end of the plunger which extends beyond the front edge of the brake drum 91 is adapted to function as the safety stop lug, as I shall presently describe.

Referring to the other brake drum 91', there is mounted within the open rear face of this brake drum an adjustable eccentric 101 which drives the power actuator for controlling the automatic releasing of the clutch. This eccentric encircles the crank shaft 25 in separated relation therefrom so as to be angularly adjustable relatively to the crank shaft. A cup-shaped flange 102 extends outwardly from the eccentric and then extends forwardly to embrace the end flange 93 on the drive sleeve 41. A plurality of angularly spaced threaded bosses project outwardly from the flange 102 for receiving set screws 103 which thread radially inwardly for entering selected ones of a plurality of sockets formed around the exterior of the flange 93. It will be apparent that by loosening the set screws 103 the eccentric 101 can be angularly adjusted relatively to the flange 93 of drive sleeve 41, and then refastened to the flange 93 by the set screws 103. This change of angular position of the eccentric 101 relatively to the crank 25' of crank shaft 25 is for the purpose of adapting the clutch mechanism to different press speeds. For example, the power release of the clutch must be initiated at an earlier point in the cycle in the case of high press speeds.

Referring to Figure 2, the clutch controlling brake drum 91 is embraced by two arcuate brake shoes 105, 106, and it will be understood that the companion brake drum 91' in rear of the drum 91 is embraced by a corresponding pair of brake shoes 105' and 106'. Each of these brake shoes is lined with any suitable brake lining material 107. The upper ends of the two pairs of brake shoes are pivotally mounted on stationary mounting pins 108 and 109 projecting outwardly from a bracket 111 secured to the press frame 24. The lower ends of each pair of brake shoes are normally forced toward each other through the action of spring mounting rods 112, 112'. Each rod extends through bosses 113, 114 formed on the lower portions of their associated brake shoes. One end of the rod is headed for engaging against a collar 115 having knife edged rocker abutment against the boss 114. The other end of the rod is threaded for receiving a wing nut 116 which adjusts the pressure of a compression spring 117 mounted on the rod, the inner end of said spring bearing against a collar 118 having knife edged abutment against the boss 113.

Formed at the lower extremities of the series of brake shoes are guide bosses 121 and 122 in which spring take-up rods 123 are guided for endwise movement. As shown in Figure 10, the inner end of each take-up rod 123 is pinned or otherwise fastened in a cylindrical head 124 which is free to slide endwise in a guide bore 125 in the guide boss. A tubular guide stem 126 has a threaded inner end 127 which screws into a thread at the outer end of the bore 125. The rod 123 is provided with a long adjusting thread 128 over which screws an adjustable stop or limit sleeve 129 having a stop flange 131 at its lower end adapted to abut the under side of the guide stem head 127. Mounted on the outer end of said stop or limit sleeve 129 is a hex-head nut or collar 132 which is held against rotation on the sleeve by forming the sleeve with a splayed surface 133 and forming the hex-head collar with a D-shaped opening having a matching flat surface engaging this splayed surface. A spring centering washer 134 bears against the underside of the collar 132 and centers the outer end of a relatively light compression spring 135, the inner end of which spring bears against the threaded end head 127 of the stem 126. By rotating the hex-head 132 the position of the stop sleeve 129 can be adjusted inwardly or outwardly along the threaded take-up rod 123, such adjustment serving to shift the position of the guide sleeve 126, spring 135 and lower end of the brake shoe inwardly or outwardly along the take-up rod 123. This adjustment results in either an earlier or later engagement of that particular brake shoe with its brake drum. A lock nut 137 screws over the threaded outer end of the rod 123 and serves to lock the adjusted position of the stop sleeve 129 and brake shoe along the length of the pull rod 123. The guide head 124 at the inner end of each rod 123 carries a transverse pivot pin 138 on which are mounted a pair of parallel toggle links 141 disposed in side by side relation. The inner ends of these toggle links are pivotally mounted on a knuckle pivot 142 extending through one of the side arms of the T-shaped rocker member 144. The inner end of each guide boss 121 has arcuate recesses 145 formed therein for receiving the cylindrical bearing portions 146 formed on the guide portion 124.

The toggle rocker 144 is secured to a rock shaft 148 which oscillates the rocker back and forth between the brake engaging position illustrated in full lines and the brake releasing position illustrated in dotted lines. In the brake engaging position shown in full lines the knuckle pivot 142 occupies a position considerably below the line of dead center alignment extending between the axes of pivot pin 138 and rock shaft 148. In this position of the parts the relatively heavy pressure of the brake engaging spring 117 is operative to force the brake shoes 105 and 106 into firm braking engagement with the drum 91. When the toggle rocker 144 is swung into the dotted line position the knuckle pivot 142 is carried through and slightly beyond the line of dead center alignment extending between the axes of pin 138 and shaft 148. This exerts outward thrusting force through the toggle links 141 for releasing the brake shoes from the brake drum. In the reverse operation of engaging the brake shoes, the return oscillation of the toggle rocker into its full line position breaks the over-center locking relation of the toggle links 141 and permits the brake spring 117 to set the brake shoes. The spring take-up action which can now occur between the guide head 124 and the guide sleeve 127 in opposition to the relatively light pressure of the spring 135 results in a take-up or equalizing relation between all of the brake shoes. As hereinafter described, the two brake shoes 105' and 106' for the other brake drum 91' are actuated through an identical form of toggle rocker 144' serving to control the brake shoes through an identical arrangement of spring rods 123, guide heads 124, toggle links 141, etc. Hence, under normal operating conditions or under most operating conditions the two pairs of brake shoes engage their respective brake drums substantially simultaneously and release their respective brake drums substantially simultaneously. Accordingly, four brake shoes have concurrent operation through their respective toggle rockers 144, 144' and rock shaft 148. The spring take-up or equalizing relation described above permits the take-up rod 123 to continue to move inwardly with continued rocking movement of the toggle rockers even after the brake shoe of that take-up rod has come into firm braking engagement with its brake drum. Thus, if one brake shoe engages its brake drum substantially in advance of the other three brake shoes, that fact will not stop continued swinging movement of the toggle rockers under the pressure of the relatively heavy springs 117. This makes sure that all four brake shoes will engage their brake drums with substantially the same or equalized pressures. In the absence of such equalizing arrangement, the toggle linkage might result in one brake shoe bearing with considerable pressure against its brake drum while the other three brake shoes had very little or no firm bearing engagement against the brake drums. In this regard, the provision of the inward and outward adjustment of the end of each brake shoe along the length of its respective spring take-up rod 123 serves the further purpose of enabling different timing adjustments to be had between the two brake drums. That is to say, the timing of the engagement of the brake shoes may be adjusted so that the outer brake drum 91 which controls the clutch can be released ahead of the inner brake drum 91' which releases the crank shaft.

This difference of timing, which can be had if desired, avoids any possibility of the crank shaft 25 starting to run backwardly under the pressure of the reverse drive toggle springs 53 before the clutch 31—32 becomes engaged for transmitting forward rotation to the crank shaft. This adjustable relation also enables one or both inner shoes 105', 106' to be adjusted to exert a slight constant drag on the crankshaft brake drum 91'. Furthermore, the adjustable relation enables the brake shoes to be adjusted to compensate for wear of their brake linings 107.

Referring now to the clutch control mechanism which rocks the rock shaft 148 for selectively causing single trip or single stroke operation or repeating operation of the press as desired, it will be seen from Figure 1 that the rock shaft is journaled in a housing 151 which is suitably secured to the press frame 24. The main body portion of the rock shaft 148 is longitudinally splined, and the outer toggle rocker 144 has splined engagement therewith which compels this member to rock with the shaft. The other toggle rocker 144' for controlling the crank shaft brake drum 91' is free to oscillate on a sleeve 154 which is splined to the rock shaft. Provision is made for releasably coupling this inner toggle rocker 144' to the outer toggle rocker 144, whereby the brake mechanism for the crank shaft may be made to operate concurrently with the brake mechanism for engaging the clutch, or the brake mechanism for the crank shaft may be made non-functioning in the sense that it merely imposes a light frictional drag on the crank shaft at all times to prevent coasting or overthrow of the crank and ram. This releasable coupling means for selectively coupling the two toggle rockers together comprises a plunger rod 155 mounted for sliding reciprocation in a guide sleeve 156 carried by the rocker 144. A spring 157 tends to thrust the coupling plunger in an inward direction for engaging in a coupling aperture 158 in the other toggle rocker 144'. An angularly bent handle 159 at the outer end of the plunger rod is adapted to be placed in the downwardly extending position shown when the rod is moved inwardly to coupling position. To release the coupling engagement, the handle 159 is pulled outwardly to withdraw the plunger 155 from the hole 158, whereupon the handle is revolved upwardly to engage against the outer retaining shoulder 161 at the outer end of the guide sleeve 156.

Figure 11:
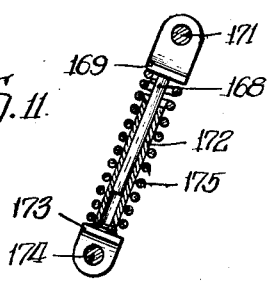

The housing 151 is provided with a removable cover plate 152 which carries an anti-friction bearing 162 supporting the reduced inner end 148' of the rock shaft 148. Rocking motion is imparted to the rock shaft through the medium of a crank 164 which has a splined hub engaging over the splines of the rock shaft. This hub has rotatable bearing support in a bearing bushing 165 supported in a bearing boss extending from the outer wall of the housing 151. Projecting laterally from the lower end of this clutch controlling crank 164 is a crank pin 164'' carrying a suitable anti-friction needle bearing on which is mounted a double nose pawl 166. The clutch controlling crank arm 164 has a relatively limited back and forth oscillation between the left hand position shown in Figure 3 and the right hand position shown in Figure 4. The double nose pawl 166 is, of course, carried bodily with the oscillatory motion of the crank 164 and crank pin 164'', and, in addition, this pawl 166 has a limited oscillatory throw around the axis of the crank pin 164''. An over-center snap motion is imparted to the double nose pawl 166 by the action of an over-center spring strut indicated generally at 167. As best shown in Figure 11, this spring strut or biasing spring assembly comprises an upper guide rod section 168 having an apertured upper head 169 which has pivotal mounting on a pin 171 projecting laterally from the lower end of the pawl 166. This upper guide rod section has a telescopic sliding fit within a lower guide sleeve section 172 formed with an apertured head 173 at its lower end, which head has swinging mounting on a stationary pivot pin 174 disposed generally below the rock shaft, crank arm and pawl. A helical compression spring 175 surrounds the rod 168 and sleeve 172 and has its ends bearing against the upper and lower heads 169 and 173. The action of this over-center toggle spring is to urge the pawl and crank arm to a completion of their movements in either direction, this spring reversing its bias and tending to cause completion of the pivotal movement in the opposite direction as soon as the axis of the upper knuckle pivot 171 passes beyond the center line z—z of Figure 3. The opposite or inner end of the knuckle pin 171 terminates in a rectangular block 176 which projects laterally from the inner side of the pawl 166, said block functioning as a stop surface adapted to be engaged by an interrupter pawl, as I shall later describe.

The left hand nose 166' of the pawl 166 is adapted to have motion imparted thereto by a manual actuator indicated generally at 178, and the right hand nose 166'' of said pawl is adapted to have motion imparted thereto by a power actuator indicated generally at 179. These two actuators comprise rotatable collars disposed in side by side relation and both mounted for oscillatory movement about the axis of the rock shaft 148. As shown in Figure 1, suitable anti-friction bearings 181 are preferably interposed between these actuators and the reduced inner end 148' of the rock shaft. The manual actuator 178 is formed with a radially projecting lug to which is anchored a block 178a which projects axially toward the power actuator 179. This block 178a is adapted to engage the left hand nose 166' of the double nose pawl. Similarly, the power actuator 179 has a radially extending lug to which is anchored a block 179a which projects axially toward the manual actuator. This latter block 179a is adapted to engage the right hand nose 166'' of the double nose pawl. As best shown in Figure 1, the double nose pawl is mounted in a plane lying directly between the planes of the actuators 178 and 179 so that the two noses of said pawl are in a position to be actuated alternately by the actuator blocks 178a and 179a. When either nose of the pawl is pressed inwardly against the actuators by the over-center spring 167 the upper extremity of that pawl nose rides on matching peripheral surfaces 182 of both actuators, as clearly shown in Figure 1.

Figure 4:
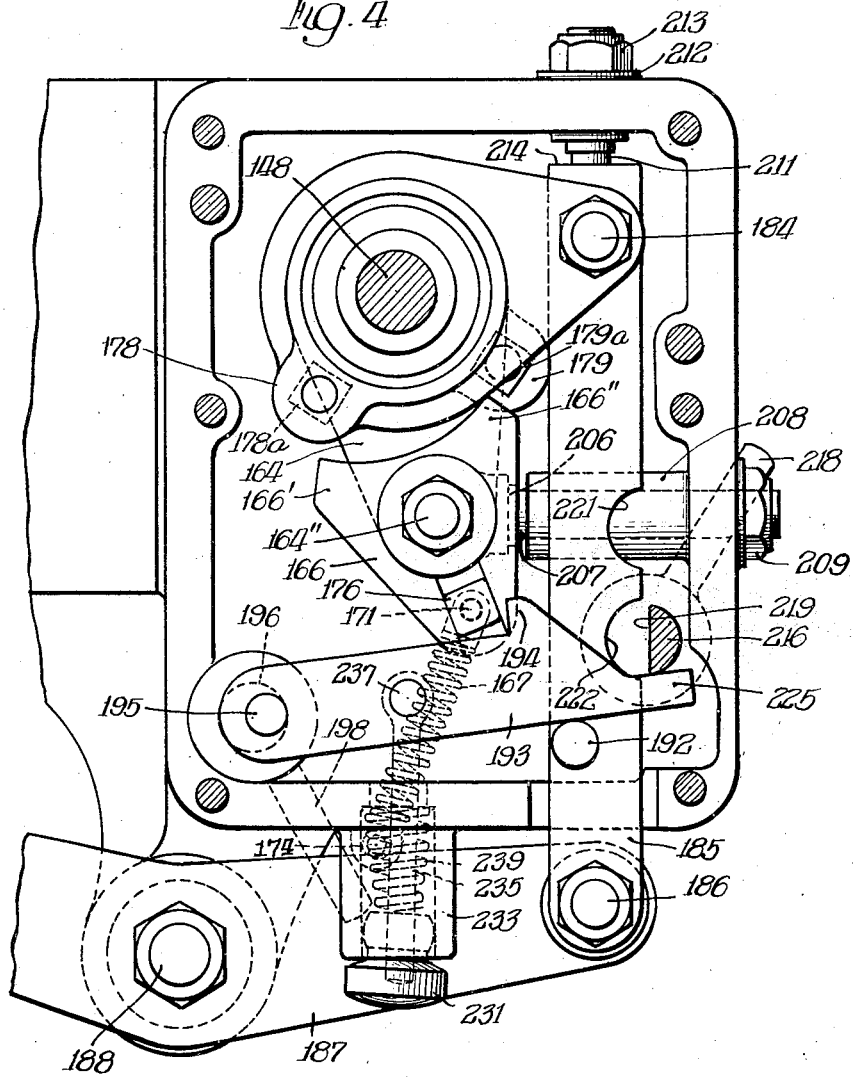
Figure 4 is a fragmentary view similar to Figure 3, showing a further step in the single stroke operating cycle.

An arm projecting outwardly from the manual actuator 178 carries a pivot bolt 184 which establishes pivotal connection with the upper end of a vertically reciprocating link 185. The link extends down through a slot in the bottom of the housing 151 and carries a pivot bolt 186 at its lower end for establishing pivotal connection with one end of a rocker lever 187. Said lever is pivoted on a stationary fulcrum pivot 188 projecting from the frame 151, and the other arm of said lever is pivotally connected at 189 with a link 191 extending down to a foot treadle or like tripping member, not shown. The operating relation is such that when the treadle or other tripping member is actuated to cause the press to operate, a downward pull is transmitted through link 191 to lever 187 for thrusting the other link 185 in an upward direction. This oscillates the manual actuator 178 in a counterclockwise direction for throwing the clutch control member 164 and pawl 166 toward the right (Figure 4), as will be later described in detail. The lower portion of the actuating link 185 carries a laterally projecting lifting pin 192 adapted to raise an intercepting dog 193 from the lower position shown in Figure 3 to the upper positions shown in Figures 4 and 5. Said dog or pawl 194 has an upwardly extending stop shoulder 194 which lies entirely below the path of movement of interrupter block 176 on the double nose pawl 166 when the interrupter pawl 193 is in the lower position shown in Figure 3, but which stop shoulder is swung upwardly to a point where it can interrupt motion of said block 176 when the dog 193 is lifted up to the position shown in Figure 5. The intercepting dog 193 swings up and down around the axis of a pivot pin 195 which is laterally shiftable or displaceable for shifting the dog 193 from the nonintercepting position shown in Figure 4 to the intercepting position shown in Figure 5. This pin 195 projects eccentrically from the end of a cylindrical mounting pintle 196 which is journaled in a bearing boss 197 formed in the housing 151. An operating handle 198 is secured to the outer end of said mounting pintle 196 and, if desired, one side of this handle may be provided with the inscription "Single stroke" on one side of the handle adapted to be presented to view when the handle is swung downwardly to the full line position shown in Figure 1, and the other side of the handle may be provided with the inscription "Repeating" which will be presented to view when the handle is swung upwardly to the dotted line position shown in Figure 5. Referring particularly to Figures 3 and 4, when the selecting handle 198 is swung downwardly, as indicated in dotted lines in these figures, the shiftable pivot 195 occupies a position displaced toward the right. Hence, when the intercepting dog 193 is lifted upwardly from the position shown in Figure 3 to the position shown in Figure 4 the shoulder 194 of this dog is incapable of performing any intercepting function, i. e., it is incapable of interrupting any part of the travel of the interrupter block 176, owing to the fact that said stop shoulder has now been shifted sufficiently far to the right so that the clutch control member 164 and pawl 166 reach the limit of their movement toward the right before the interrupter block 176 engages the stop shoulder 194. Hence, the double nose pawl 166 is free to complete its full range of oscillatory movement into the position shown in Figure 4, in which position the right hand nose 166" of the pawl is positioned at a point where the power actuator block 179a will strike said nose and impart movement to the pawl in the oscillation of said power actuator 179. Conversely, when the "repeating" selection is made by swinging the handle 198 upwardly to the position indicated in dotted lines in Figure 5, the shiftable pivot 195 is displaced to the left sufficiently far so that when the interrupting dog 193 is lifted to its motion interrupting position the stop shoulder 194 will be so disposed in the path of movement of the interrupter block 176 that motion of the lower end of the double nose pawl 166 will be interrupted before the oscillatory control member 164 reaches the limit of its movement. Hence, the double nose pawl is oscillated in a clockwise direction about the crank pin 164" for swinging the right hand nose 166" downwardly to a position where it lies out of the path of the power actuator block 179a. At this time, the power actuator is incapable of imparting motion through the motion transmitting pawl 166 to the clutch control member 164 and hence the clutch remains engaged for causing a repeating operation of the press, as will hereinafter appear in the description of the cycle of operations.

As best shown in Figure 3, the power actuator 179 has a laterally extending arm which carries a pivot bolt 201 for establishing pivotal connection with a reciprocating link 202. Said link functions as the pitman or connecting rod for an eccentric follower 203 which surrounds the eccentric 101 (Figure 1). The eccentric follower is provided with a downwardly extending threaded boss 204 in which a threaded upper end of the link 202 has adjustable mounting. It will be understood that each revolution of the crank shaft 25 will transmit a cycle of up and down oscillatory movement to the power actuator 179, which up and down oscillation can be adjusted to occur in different timed relations to the position of the crank 25a by angularly rotating the eccentric 101 to different positions of adjustment relatively to crank 25a, as previously described in connection with the adjustable mounting means 102, 103.

The throw of the clutch control member 164 toward the right is limited by a stop surface 206 on this member coming up against an adjustable stop bolt 207, as shown in Figure 4. This stop bolt 207 has threaded mounting in a boss 208 projecting inwardly from the outer wall of the housing 151, said bolt being locked in any adjusted position by the lock nut 209. This stop 207 serves to limit the motion of the toggle parts 141, 144 in their brake-releasing, clutch-engaging direction of movement. That is to say, this stop 207 serves to stop the toggle rocker 144 with the knuckle pivots 142 disposed substantially in dead center alignment or at any desired degree past this position of dead center alignment. Another stop bolt 211 is mounted in a threaded boss 212 in the upper wall of the housing 151, this upper stop bolt being locked in any adjusted position by the lock nut 213. This upper stop bolt is adapted to be struck by the upper surface 214 of the reciprocating link 185 that responds to foot treadle operation. This adjustable stop serves to control the range of oscillatory movement that the foot treadle can transmit to the manual actuator in the operation of engaging the clutch.

Manually actuated locking mechanism is preferably provided for the purpose of either locking the control mechanism against any possible actuation through the foot treadle, or for locking the foot treadle and manual control parts in their actuated position for causing a continuously repeating operation of the press. This locking mechanism comprises a rotatable lock shaft 216 which is journaled in the side wall of the housing 151. A handle 218 on the outer end of said lock shaft is adapted to swing from an upper "unlocked" position indicated in full lines in Figure 2 to a lower "locked" position indicated in dotted lines. Referring to Figure 4, the locking shaft has a diametrical slot 219 therethrough through which the outer edge of the reciprocating link 185 is adapted to slide. Said reciprocating link has two vertically spaced arcuate notches 221 and 222 cut therein. When the link is lifted to its upper position corresponding to the manual tripping of the punch press, the locking shaft 216 can be rotated to present its solid peripheral portion into the notch 222 for locking the mechanism in this actuated position so that the clutch will remain engaged and the press will continue to operate. Conversely, when the reciprocating link 185 is in its lower position, the locking shaft 216 can be rotated to present its solid peripheral portion to the arcuate notch 221. This positively locks the clutch control mechanism against any possibility of accidental operation through the foot treadle, which positive locking may be employed to prevent tampering or accidental operation when no punching or drawing operations are to be performed by the press. A lug 225 projecting from the right hand end of the interrupter pawl 193 is adapted to strike the shaft 216 for limiting the upward movement of the pawl to the point where the stop block 176 does not drag along the horizontal upper edge of the interrupter pawl 193.

My improved clutch control mechanism also comprises mechanism for making the operation of the press subject to automatic electrical control, etc., or subject to the feed of material in the case of continuous feed presses. A plunger head 231 is guided in the lower end of a guide boss 233 extending from the bottom of the casing. This plunger head actuates a plunger rod 235 which has pivotal connection at 237 with the interrupter dog 193. A compression spring 239 normally urges the plunger rod and interrupter dog to their lower positions. Any suitable control member 241 may be provided for holding the plunger head 231 pressed upwardly when it is desired to hold the interrupter dog in the position shown in Figure 5 for causing repeating operation of the press. The control member 241 may be the core of an electric solenoid which is energized through an automatic control circuit. The opening of this control circuit in response to any dangerous condition or other condition calling for the stopping of the press results in the deenergization of the solenoid, with the result that the plunger head 231 and interrupter dog move downwardly to their lower positions for enabling the power actuator to release the clutch. The control member 241 may also be a mechanical device subject to the continuous feed of stock to the punch press. Thus, when the source of stock fed to the machine comes to an end the control member 241 moves downwardly and automatically stops the press.

My improved construction may also be provided with a positive blocking arm 251 (Figure 2) for positively stopping the rotation of the driven clutch element in the event that this driven clutch element should continue to rotate after the clutch has been released and after the driven clutch element has failed to come to rest within a normal space of travel. This positive blocking arm 251 has an inclined cam surface 251' at its swinging end adapted to be engaged by the plunger 94 for forcing the arm 251 in a clockwise direction toward the center of the clutch structure. The arm is mounted on a stationary pivot 253 and is connected through a pivot 255 with a link 257 having its lower end pivotally engaging over the projecting outer end of the guide sleeve 156 that guides the coupling plunger 155. The operating relation is such that when the toggle rocker 144 is swung into its brake-releasing, clutch-engaging position indicated in dotted lines the connecting link 257 acts to swing the blocking arm 251 down to a point where the stop plunger 94 is free to pass above the arm 251. However, as soon as the toggle rocker 144 is swung counterclockwise back to its brake-engaging, clutch-releasing position illustrated in full lines in Figure 2 the connecting link 257 functions to swing the blocking arm 251 upwardly to its operative position approximately indicated in Figure 2. If the driven clutch element should fail to come to a stop after the clutch has been disengaged and after the driven clutch element has been allowed to coast through a relatively limited travel, then the stop plunger 94 comes up against the cam surface 251' on the stop arm. In consequence thereof, the arm is swung in a clockwise direction for transmitting still further braking effort through the toggle links 141, 141' to the brake shoes for increasing the braking effort exerted on the two brake drums. In addition to this, the arm positively blocks continued rotation of the stop plunger 94 after this greater braking effort has been exerted through the blocking arm. A somewhat similar form of safety stop mechanism is also disclosed in my prior application Serial No. 415,022.

I shall now briefly summarize the operation of the clutch. Assuming that the operator desires that the press only operate through a single stroke each time that the foot treadle is pressed, he moves the control lever 198 down into the lower position illustrated in Figures 1, 2, 3 and 4. This shifts the intercepting dog 193 to its non-intercepting position, and thus preselects the mechanism so that only a single stroke operation will occur. As soon as he depresses the foot treadle the manual actuator 178 is oscillated in a counterclockwise direction (Figure 3), thereby bringing actuator block 178a up against nose 166' of the motion transmitting pawl 166 and causing the clutch control member 164 to swing counter-clockwise toward the right. As soon as the knuckle pivot 171 passes beyond the dead center line z—z the toggle spring 167 snaps the motion transmitting pawl 166 and clutch control member 164 toward a completion of their movements in this swinging motion toward the right. Figure 4 illustrates the completion of such swinging movement, with the stop shoulder 206 of the clutch control member abutting the stationary stop shoulder 207. At this time, the right hand nose 166" of the motion transmitting pawl 166 occupies a position in the downward path of the power actuator block 179a by reason of the fact that the motion of the pawl 166 has not been blocked or intercepted by the dog 193. Referring now to the sequence of operations which follows the oscillation of the clutch control crank 164 from the position shown in Figure 3 to the position shown in Figure 4, such oscillation rocks the toggle rocker 144 in a clockwise direction (Figure 2) from the full line position into the dotted line position. This releases the braking engagement of the brake shoes 105, 106 and 105', 106' from the brake drums 91, 91'. As previously described, if it is desired to release the drum 91 in advance of the drum 91' such can be readily accomplished by appropriate adjustment of the limit sleeve 129 inwardly or outwardly along the thread 128 of rod 123 (Figure 10) at each of the respective brake shoes. The release of the clutch controlling brake drum 91 permits this drum to start rotating ahead, largely from the rotative component which the axial thrusting pressure transmits through the balls 82 and inclined pockets 83, 84 to the ring 81. As a result of this forward rotation of the brake drum 91 and ring 81, the toggle strut ring 36 is free to shift axially toward the left under the pressure of the strut springs 53. The driven clutch element 32, moving concurrently with the toggle strut ring 36, comes into clutching engagement with the driving clutch element 31, whereupon a large torque load is immediately imposed upon the forward driving toggle struts 51. The forward rocking of these struts under this torque load immediately creates a greatly increased shifting force for forcing the driven clutch element into a very high pressure engagement with the driving clutch element 31.

The crank 25' and connected ram of the press start downwardly as soon as the crank shaft begins rotating, and the high pressure engagement of the clutch is completed by the toggle struts 51 either before the moving die strikes the work or during the time that the moving die is first engaging the work and building up a large torque load. After the performance of the punching or drawing operation, the control mechanism starts the reverse operation of releasing the clutch. The eccentric 101 is rotating directly with the crank shaft, and at a particular point in such rotation the eccentric starts a downward throw of the eccentric follower 203, with resulting clockwise oscillation of the power actuator 179. When the press is operating at a very high driving speed, the time delays incident to inertia of the parts, play, etc., may necessitate that the eccentric 101 be adjusted to start this clockwise oscillation of the power actuator 179 even before the movable die engages the work. Such clockwise oscillation quickly brings the actuator block 179a into engagement with the right hand nose 166" of the motion transmitting pawl 166 and starts moving the pawl and clutch control member 164 in a clockwise direction toward the left. As soon as the knuckle pivot 171 passes beyond the dead center line z—z (Figure 3) the biasing spring 167 completes the motion of these parts in this direction, snapping the motion transmitting pawl and the clutch control member over into their normal positions illustrated in Figure 3. Referring to Figure 2, as soon as the knuckle pivot 142 moves down below the dead center line x—x the pressure of the brake springs 117, 117' is effective to accelerate the motion of the toggle rockers 144, 144' for quickly bringing the brake shoes into engagement with their respective brake drums 91, 91'. The exertion of braking retardation against brake drum 91 decelerates and stops ball cam ring 81 and causes the ball cam mechanism 82—84 to move the toggle strut ring 36 toward the right. This shifts the shiftable clutch element 32 into clutch releasing position for stopping further drive to the crank shaft. Concurrently therewith, the braking retardation imposed on the other brake drum 91' is bringing the crank shaft 25 to rest, the crank shaft coming to a stop with the crank 25' and ram approximately in the upper dead center position. Any accidental failure of the crank shaft to stop substantially at this point brings the rotating stop 94 into engagement with the positive blocking lever 251, whereby to impose additional braking pressure on the brake drum 91' and, finally, to positively block further rotative movement of the stop 94.

If the press speed should be so high that the operator cannot remove his foot from the treadle before the completion of the cycle, or if he should carelessly keep his foot on the treadle, this cannot possibly cause a repeating operation because the pawl 166 still completes its clutch releasing throw to the left. The nose 166' of the pawl then lands on the flat outer surface of the manual actuator block 178a instead of in front of said block. The pawl can only be gotten in front of said block by the operator releasing the foot treadle and allowing the manual actuator 178 to return to normal.

Figure 5:
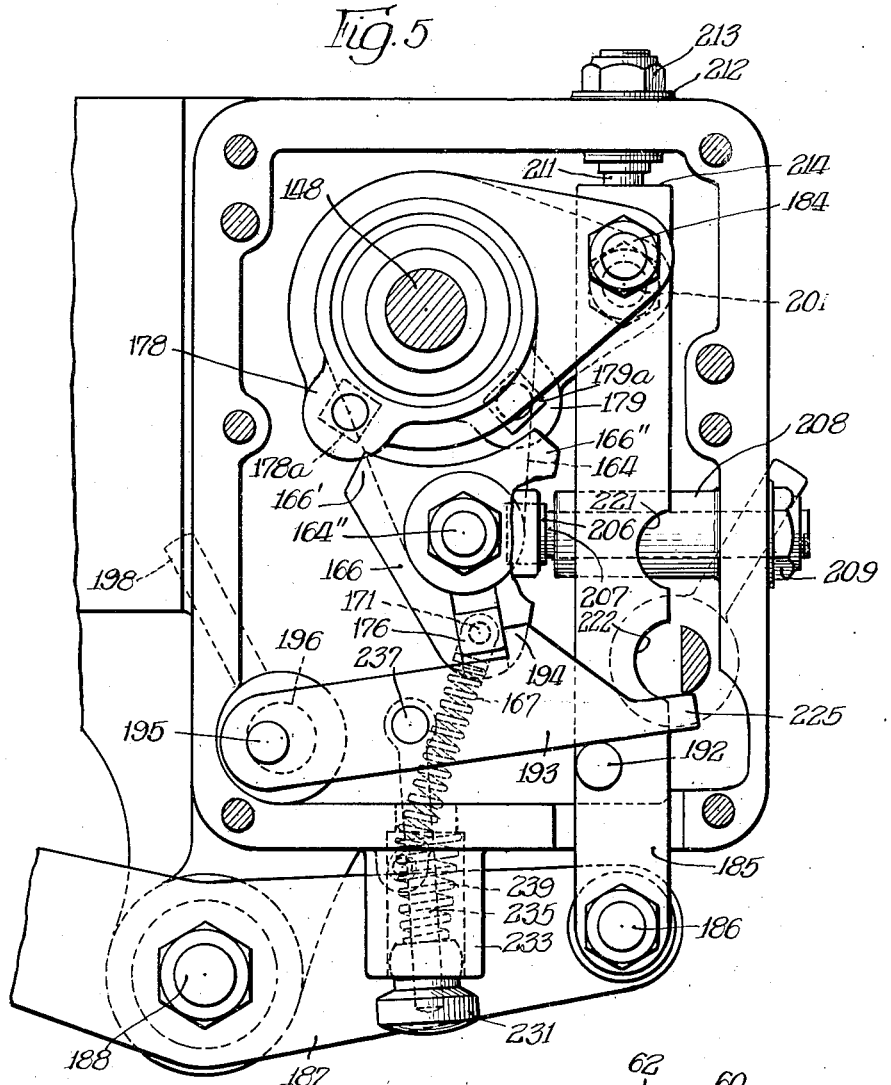
Figure 5 is a view similar to Figures 3 and 4, showing an operating step in the repeating cycle of the clutch control mechanism.

Assuming now that the operator desires to set the control mechanism for a repeating operation of the press, he swings the preselecting lever 198 into the upper position illustrated in Figure 5. This retracts the intercepting dog 193 toward the left into a position where it is operative to block a part of the motion of pawl 166. Hence, as shown in Figure 5, when the depression of the treadle lever has oscillated the manual actuator 178 in a counterclockwise direction and has swung the pawl 166 and clutch control member 164 beyond the center line z—z, the block 176 on the pawl 166 comes up against the stop shoulder 194 of intercepter pawl 193. This causes the pawl 166 to oscillate through a short rotative throw around crank pin 164" as the crank and crank pin complete their swinging movement toward the right. This oscillation of the motion transmitting pawl around the crank pin swings the right hand nose 166" down out of the arcuate path of movement of the power actuator block 179a. Accordingly, when the throw of the eccentric 101 starts oscillating the power actuator 179 in a downward, clockwise direction the block 179a moves past the nose 166" without transmitting any motion to the pawl 166. Hence, the power actuator does not function to release the clutch for stopping the press after a single stroke. Accordingly, the clutch remains engaged and the press continues to operate so long as the intercepting pawl 193 remains in its elevated position, holding the motion transmitting pawl 166 out of the path of the power actuator. Said intercepting pawl 193 will remain in this raised position as long as the operator continues to hold his foot on the treadle lever. As soon as the treadle lever is released the downward movement of the link 182 and lifting pin 192 permits the intercepter pawl 193 to drop down to normal position, whereupon the motion transmitting pawl 166 is quickly oscillated into its final position by the biasing spring 167, in which final position the pawl nose 166" lies in the path of the power actuator block 179a and hence has the motion transmitted thereto from said block in the next downward oscillation of the power actuator.

When the clutch is arranged so that the repeating operation is made subject to automatic control exercised through plunger head 231, such as by the control rod 241 or its equivalent, the intercepting pawl 193 is held in this raised position after the operator releases the treadle lever. The intercepter pawl remains in this raised intercepting position so long as the plunger head 231 is held in its raised position. Immediately upon the release of the head 231, the lowering of the pawl 193 permits the power actuator to transmit motion through the motion transmitting pawl for releasing the clutch and bringing the press to rest.

In the event that it is desired to place the clutch control mechanism in such condition that the operator can only effect single stroke operation, without any possibility of his being able to change over to repeating operation, all that the plant superintendent has to do is to release the housing cover 152 and entirely remove the intercepting dog 193 from the assembly by sliding the dog endwise off the pins 195 and 237. With this dog removed, there is nothing to intercept the full throw of the motion transmitting pawl 166, and hence single stroke operation cannot now be nullified or circumvented.

While I have illustrated and described what I regard to be the preferred embodiment of my invention, nevertheless it will be understood that such is merely exemplary and that numerous modifications and rearrangements may be made therein without departing from the essence of the invention.

I claim:

1. In combination, a clutch, an oscillatory clutch control member, a manual actuator, a power actuator, a double nose pawl pivotally mounted on said oscillatory clutch control member and operative to transmit motion from said manual actuator to said control member through one nose and operative to transmit motion from said power actuator to said control member through the other nose, over-center spring means for causing said pawl to pivot on said clutch control member in the oscillatory movement of the latter for bringing each nose of the pawl alternatively into position to receive motion from said actuators, and intercepting means adapted to intercept said pawl for holding one nose thereof out of the path of one of said actuators.

2. In combination, a clutch, a member adapted to be driven thereby, clutch actuating mechanism, a first brake governing said clutch actuating mechanism, a second brake serving only to govern the motion of said driven member, and control mechanism for jointly controlling said brakes and including means for causing one brake to operate at a different time than the other brake.

3. In combination, a clutch comprising a shiftable clutch element, a driven member adapted to be driven by said clutch, clutch actuating mechanism governing the shifting of said shiftable clutch element, a first friction brake governing said clutch actuating mechanism, a second friction brake operative to exert braking retardation against the motion of said driven member, and control mechanism for automatically causing said brakes to operate substantially concurrently and including means for automatically causing said first brake to release slightly in advance of said second brake.

4. In a punch press, the combination of a crankshaft for driving a press ram, a clutch for driving said crankshaft, clutch actuating mechanism, a first brake governing said clutch actuating mechanism, a second brake serving only to govern the motion of said crankshaft, and control mechanism for jointly controlling said brakes including releasable coupling means for automatically causing one of said brakes to be actuated concurrently with the other brake or enabling it to be released therefrom so as not to respond to said control mechanism when said other brake is operated.

5. In combination, a clutch, a driven member adapted to be driven thereby, clutch actuating mechanism, a first brake drum and a first set of brake shoes cooperating therewith for governing said clutch actuating mechanism, a second brake drum and a second set of brake shoes cooperating therewith for governing said driven member without exercising any control over said clutch actuating mechanism, and control mechanism operative to effect common actuation of both sets of brake shoes or to effect actuation of only one of said sets of brake shoes.

6. In combination, a clutch, a driven member adapted to be driven thereby, clutch actuating mechanism, a first brake governing said clutch actuating mechanism, a second brake serving only to govern said driven member, control mechanism for both of said brakes, and means for rendering said clutch incapable of engagement through said first brake while still leaving said second brake capable of holding said driven member at any desired angular positoin.

7. In combination, a clutch, a member adapted to be driven thereby, clutch actuating mechanism, a first brake drum governing said clutch actuating mechanism, a second brake drum governing the motion of said driven member, brake means adapted to engage said brake drums, and means operative to couple said brake drums together when it is desired to rotate said driven member other than through said clutch.

8. In combination, a clutch, clutch actuating mechanism comprising a brake drum for governing said clutch, a plurality of brake shoes for engaging with said brake drum, spring means normally tending to engage said shoes against said drum, control means for releasing said brake shoes, and spring take-up means effective between said control means and one of said brake shoes for enabling one of said brake shoes to move into effective braking engagement with said brake drum even though another of said brake shoes has earlier engaged said brake drum.

9. In combination, a clutch, clutch actuating mechanism, a brake drum governing said clutch actuating mechanism, a pair of brake shoes adapted to engage said drum, clutch control mechanism comprising a toggle rocker, toggle links pivotally connected with said rocker, and spring take-up devices establishing a one-way resilient coupling between said toggle links and said brake shoes whereby substantially to equalize said brake shoes in the operation of engaging said brake drum.

10. A punch press comprising a ram, a crankshaft for reciprocating said ram, a clutch for driving said crankshaft, control mechanism therefor comprising a motion transmitting member governing the operation of said clutch, motion interrupting means for controlling the movement of said motion transmitting member, and automatic mechanism adapted to hold said motion interrupting means in a predetermined position until an abnormal condition arises at the punch press, whereupon said motion interrupting means permits said motion transmitting member to operate to disengage said clutch.

11. In a punch press, the combination of a crankshaft, a clutch for driving said crankshaft comprising driving and driven clutch elements, clutch actuating mechanism, a brake for governing said clutch actuating mechanism, a toggle rocker controlling said brake, a manual actuator for actuating said toggle rocker, a power actuator for actuating said toggle rocker, and safety means operative upon predetermined overtravel of said clutch for imparting further rocking motion to said toggle rocker and thereafter positively blocking the driven element of said clutch.

12. In combination, a driven member, a clutch for driving said driven member, torque responsive release mechanism for releasing said clutch, brake means governing the operation of said release mechanism, control mechanism for said brake means comprising a rotary control member, a rotary manual actuator, a rotary power actuator responsive to said driven member, said control member and said actuators being all mounted concentrically on a stationary axis and being capable of independent rotative movement thereon, and pawl means pivotally mounted on said rotary control member for alternatively establishing operative connection with each of said actuators.

13. In combination, a driven element, a friction clutch for driving said driven element comprising a shiftable clutch element, a set of forward driving struts pivotally mounted between said elements to transmit torque from one element to the other during forward rotation, a set of reverse driving struts pivotally mounted between said elements to transmit torque from one element to the other during reverse rotation, both sets of said struts being solid, fixed length units having spherical end heads seating in spherical sockets in said elements, compression springs surrounding said reverse driving struts and seating against annular shoulders formed in said elements around the spherical sockets which receive the reverse driving struts, said compression springs tending to cause relative rotation between said elements, ball-cam thrusting mechanism operative to transmit shifting pressure to said shiftable clutch element in a clutch releasing direction, brake means governing said ball-cam mechanism, a brake control member having oscillatory movement, a manual actuator, a power actuator driven by said driven element, and a pawl pivotally mounted on said brake control member and adapted to establish engagement alternatively with said actuators.

14. In combination, a clutch for controlling the drive to a driven member, clutch control mechanism comprising brake apparatus for controlling the engaging and releasing of the clutch, control mechanism for controlling said brake apparatus comprising an oscillatory control member, an oscillatory manual actuator and an oscillatory power actuator all mounted for independent oscillatory movement, means for transmitting motion from said driven member to said power actuator, a motion transmitting pawl pivotally mounted on said oscillatory control member, and spring means serving to exert an over-center biasing action in opposite directions on said oscillatory control member and also serving to swing said pawl in opposite directions around its pivotal mounting on said control member.

15. In clutch mechanism, the combination of a driven member, a clutch for driving said member comprising a clutch element shiftable into and out of clutching engagement, a brake, means responsive to said brake for shifting said clutch element, spring toggle mechanism adapted to be biased to each side of a dead center position for operating said brake, said toggle mechanism applying said brake when biased to one side of said dead center position and releasing said brake when biased into or to the other side of said dead center position, control mechanism for controlling said toggle mechanism comprising a control member, a manual actuator for actuating said control member in one direction, a power actuator for actuating said control member in the opposite direction, a motion transmitting pawl pivotally mounted on said control member, and spring toggle means for swinging said pawl alternatively into and out of engagement with said actuators.

16. In combination, a clutch, a pivotally swinging clutch control member, a pivotally swinging manual actuator, a pivotally swinging power actuator, each of said pivotally swinging members being capable of independent pivotal motion, a motion transmitting pawl pivotally mounted on said control member adapted to be engaged alternatively by said actuators, means for automatically swinging said pawl into its alternative engaging positions, said pawl being constructed and arranged whereby it is physically impossible for it to be engaged by both actuators simultaneously, and optionally operated means for holding said pawl in a position where neither actuator can engage it.

17. In a clutch, the combination of a shiftable clutch element, a rotary element, cooperating pairs of forward driving spherical sockets carried by said elements, solid fixed-length forward driving struts seated in said forward driving sockets to transmit substantially the entire forward driving torque load from one element to the other, cooperating pairs of reverse driving spherical sockets carried by said elements, solid fixed-length reverse driving struts seated in said reverse driving sockets, annular shoulders formed around said reverse driving sockets, and compression springs surrounding said reverse driving struts and seating on said annular shoulders.

18. In combination, a rotary driven member, a clutch for driving said driven member comprising a shiftable clutch element, a shiftable servo strut ring secured to said shiftable clutch element, a non-shiftable servo strut ring secured to said driven member, two sets of oppositely facing inclined spherical sockets machined out of said two servo strut rings, a set of forward driving servo struts seating in one set of said sockets, and a set of backward driving servo struts seating in the other set of said sockets and inclined relatively to said forward driving struts, the servo struts of both sets being solid one-piece units of fixed length formed with spherical ends for seating in said spherical sockets.

19. In combination, a rotary driven member, a clutch for driving said driven member comprising a shiftable clutch element, a shiftable servo strut ring secured to said shiftable clutch element, a non-shiftable servo strut ring secured to said driven member, two sets of oppositely facing inclined spherical sockets machined out of said two servo strut rings, a set of forward driving servo struts seating in one set of said sockets, a set of backward driving servo struts seating in the other set of sockets, the servo struts of both sets being solid one-piece units of fixed-length formed with spherical ends for seating in said spherical sockets, annular shoulders formed around the set of sockets which receive said backward driving servo struts, and compression springs surrounding said backward driving servo struts and seating on said annular shoulders.

CLARENCE M. EASON.